(12) United States Patent
McIntyre

(10) Patent No.: US 6,191,815 B1
(45) Date of Patent: Feb. 20, 2001

(54) CAMERA WITH MICROFLUIDIC PRINTER

(75) Inventor: Dale F. McIntyre, Honeoye Falls, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 08/951,017

(22) Filed: Oct. 15, 1997

(51) Int. Cl.[7] ................................................. H04N 5/220
(52) U.S. Cl. ............................................. 348/220; 348/207
(58) Field of Search .................................... 348/207, 333, 348/334, 374, 325, 376; 396/429, 30; 358/906, 909.1, 426, 334, 339; 101/483; H04N 5/225

(56) References Cited

U.S. PATENT DOCUMENTS

| | | | | |
|---|---|---|---|---|
| 4,262,301 | * | 4/1981 | Erlichman ............................. | 348/220 |
| 5,715,234 | * | 2/1998 | Stephenson et al. ................. | 396/429 |
| 5,751,445 | * | 5/1998 | Masunaga ............................ | 348/426 |
| 5,771,810 | * | 6/1998 | Wolcott ................................ | 101/483 |
| 5,894,326 | * | 4/1999 | McIntyre et al. .................... | 348/333 |

* cited by examiner

*Primary Examiner*—Tuan Ho
(74) *Attorney, Agent, or Firm*—Raymond L. Owens

(57) ABSTRACT

An electronic camera responsive to a digital image stored in such camera, and having a multimode microfluidic printer for printing images of different resolutions onto receivers corresponding to the stored digital image. The camera focuses an image of a subject at an image plane and includes an area image sensor disposed at the image plane for receiving the image subject and producing a digital image representing the subject. The camera further includes electronic storage coupled to the area image sensor for storing the digitized image of the subject, and the microfluidic printer includes a plurality of colorant reservoirs including several reservoirs for containing different colorants and a plurality of colorant delivery chambers and a selectable mode control switch responsive to a selected mode of operation including different pixel spacing and colored images and the stored digital image for causing colorants to be delivered from colorant reservoirs to selected colorant delivery chambers in the correct amount. The transfer of the colorants in the chambers are then delivered to the receiver.

9 Claims, 4 Drawing Sheets

CAMERA WITH MICROFLUIDIC PRINTER

CROSS REFERENCE TO RELATED APPLICATIONS

Reference is made to commonly assigned U.S. patent application Ser. No. 08/699,955 filed Aug. 20, 1996, U.S. Pat. No. 5,679,139 entitled "Cyan and Magenta Pigment Set"; U.S. patent application Ser. No. 08/699,962 filed Aug. 20, 1996, U.S. Pat. No. 5,679,141 entitled "Magenta Ink Jet Pigment Set"; U.S. patent application Ser. No. 08/699,963 filed Aug. 20, 1996, U.S. Pat. No. 5,679,142 entitled "Cyan Ink Jet Pigment Set", all by McInerney, Oldfield, Bugner, Bermel, and Santilli; U.S. patent application Ser. No. 08/790,131 filed Jan. 29, 1997 entitled "Heat Transferring Inkjet Ink Images" by Bishop, Simons, and Brick; U.S. patent application Ser. No. 08/764,379 filed Dec. 13, 1996, abandoned entitled "Pigmented Inkjet Inks Containing Phosphated Ester Derivatives" by Martin; and U.S. patent application Ser. No. 08/868,104 filed Jun. 3, 1997 filed concurrently herewith entitled "Image Producing Apparatus For Microfluidic Printing" by Xin Wen; U.S. patent application Ser. No. 08/703,289 filed Aug. 26, 1996, U.S. Pat. No. 5,894,326 entitled "Electronic Camera Having a Printer" by McIntyre et al; and U.S. patent application Ser. No. 08/868,426 filed Jun. 3, 1997, U.S. Pat. No. 6,128,027 entitled "Continuous Tone Microfluidic Printing" by DeBoer et al; U.S. patent application Ser. No. 08/882,620 filed Jun. 25, 1997, U.S. Pat. No. 5,771,810 entitled "Continuous Tone Microfluidic Display and Printing" by Wolcott, assigned to the assignee of the present invention. The disclosure of these related applications is incorporated herein by reference.

FIELD OF THE INVENTION

The present invention relates to cameras which include a multimode microfluidic printer for printing images captured or received by the camera.

BACKGROUND OF THE INVENTION

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Memory Card.

In U.S. Pat. No. 4,262,301 an electronic camera is disclosed which includes a display device. The camera also includes a digital-to-analog converter which sends signals to the display. Also, the digital-to-analog converter selectively sends these images to a magnetic tape for storage. Images on the magnetic tape can then be produced as a hard copy by a printer which is provided on the camera. A problem with the approach in U.S. Pat. No. 4,262,301 is approach is that a print must be made in order for a user to determine whether it is satisfactory.

A shortcoming with prior electronic cameras is that the printer is spaced from the camera and must be electrically coupled to digital storage structure within the camera which frequently produces artifacts. Microfluidic printers such as ink jet printers, often use a structure which provide relative movement of a head and a media sheet which induces artifacts into the output hard copy print and is therefore difficult to provide an effective structure mounted on a camera body.

Microfluidic pumping and dispensing of liquid chemical reagents is the subject of three U.S. Pat. Nos. 5,585,069; 5,593,838; and 5,603,351, all assigned to the David Sarnoff Research Center, Inc. The system uses an array of micron sized reservoirs, with connecting microchannels and reaction cells etched into a substrate. Electrokinetic pumps include electrically activated electrodes within the capillary microchannels provide the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp. 1792–1798 (1994). The chemical reagent solutions are pumped from a reservoir, mixed in controlled amounts, and them pumped into a bottom array of reaction cells. The array could be decoupled from the assembly and removed for incubation or analysis. When used as a printing device, the chemical reagent solutions are replaced by dispersions of cyan, magenta, and yellow pigment, and the array of reaction cells could be considered a viewable display of picture elements, or pixels, comprising mixtures of pigments having the hue of the pixel in the original scene. When contacted with paper, the capillary force of the paper fibers pulls the dye from the cells and holds it in the paper, thus producing a paper print, or reproduction, of the original scene.

One problem with this kind of printer is the rendering of an accurate tone scale. The problem comes about because the capillary force of the paper fibers remove all the pigment solution from the cell, draining it empty. If, for example, a yellow pixel is being printed, the density of the image will be fully yellow. However, in some scenes, a light, or pale yellow is the original scene color. One way to solve this problem would be to stock and pump a number of yellow pigments ranging from very light to dark yellow. Another way to solve the tone scale problem is to print a very small dot of dark yellow and leave white paper surrounding the dot. The human eye will integrate the white and the small dot of dark yellow leading to an impression of light yellow, provided the dot is small enough. This is the principle upon which the art of color halftone lithographic printing rests. It is sometimes referred to as area modulation of tone scale. However, in order to provide a full tone scale of colors, a high resolution printer is required, with many more dots per inch than would be required if the colors could be printed at different densities.

Another solution to the tone scale problem has been provided in the area of ink jet printers, as described in U.S. Pat. No. 5,606,351 by Gilbert A. Hawkins, the disclosure of which is hereby incorporated by reference. In an ink jet printer, the drop size is determined primarily by the surface tension of the ink and the size of the orifice from which the drop is ejected. The ink jet printer thus has a similar problem with rendition of tone scale. U.S. Pat. No. 5,606,351 overcomes the problem by premixing the colored ink with a colorless ink in the correct proportions to produce a drop of ink of the correct intensity to render tone scale. However, ink jet printers require a relatively high level of power to function, and they tend to be slow since only a few pixels are printed at a time (serial printing), in comparison to the microfluidic printer in which all the pixels are printed simultaneously (parallel printing).

Another problem with microfluidic printing is that of image resolution. Often it is desired to print a low resolution image which does not have the same quality constraints as an image with higher resolution. Still further, it is highly desirable to be able to change the size of an image printer.

SUMMARY OF THE INVENTION

An object of this invention is to provide an electronic camera with an integrated compact, low powered multimode printer which rapidly prints high quality continuous tone images of different resolutions.

This objects is achieved in an electronic camera responsive to a digital image stored in such camera, and having a multimode microfluidic printer for printing images of different resolutions onto receivers corresponding to the stored digital image, the improvement comprising:

a) means for focusing an image of a subject at an image plane;
   b) area image sensor means disposed at the image plane for receiving the image subject and producing a digital image representing the subject;
   c) storage means coupled to the area image sensor for storing the digitized image of the subject; and
   d) the microfluidic printer including a plurality of colorant reservoirs including several reservoirs for containing different colorants and a plurality of colorant delivery chambers;
   e) selectable mode control means responsive to a selected mode of operation including different pixel spacing and colored images and the stored digital image for causing colorants to be delivered from colorant reservoirs to selected colorant delivery chambers in the correct amount; and
   f) means for causing the transfer of the colorants in the chambers to the receiver.

ADVANTAGES

By using an electronic camera with a microfluidic printer, the printer can be operated in multiple modes producing image of desired resolution with such images being either monochromatic or colored. A user can readily acquire visual images on receivers directly from the camera. The printer in the camera, in accordance with the present invention, causes colorants to be delivered from colorant reservoirs to selected colorant delivery chambers in the correct amount.

A feature of the present invention is that by using colorant delivery chambers, some of them can be left empty to vary pixel spacing. Microfluidic printing provides high quality continuous tone prints.

Another feature of the invention is that the printer is low power, compact, and portable.

A further feature of the invention is that the printing process is fast, because all the colored pixels can be printed simultaneously.

DETAILED DESCRIPTION OF THE INVENTION

Before discussing the electronic camera in accordance with the present invention, a microfluidic printer which is used in the camera will now be described.

Figure 3:
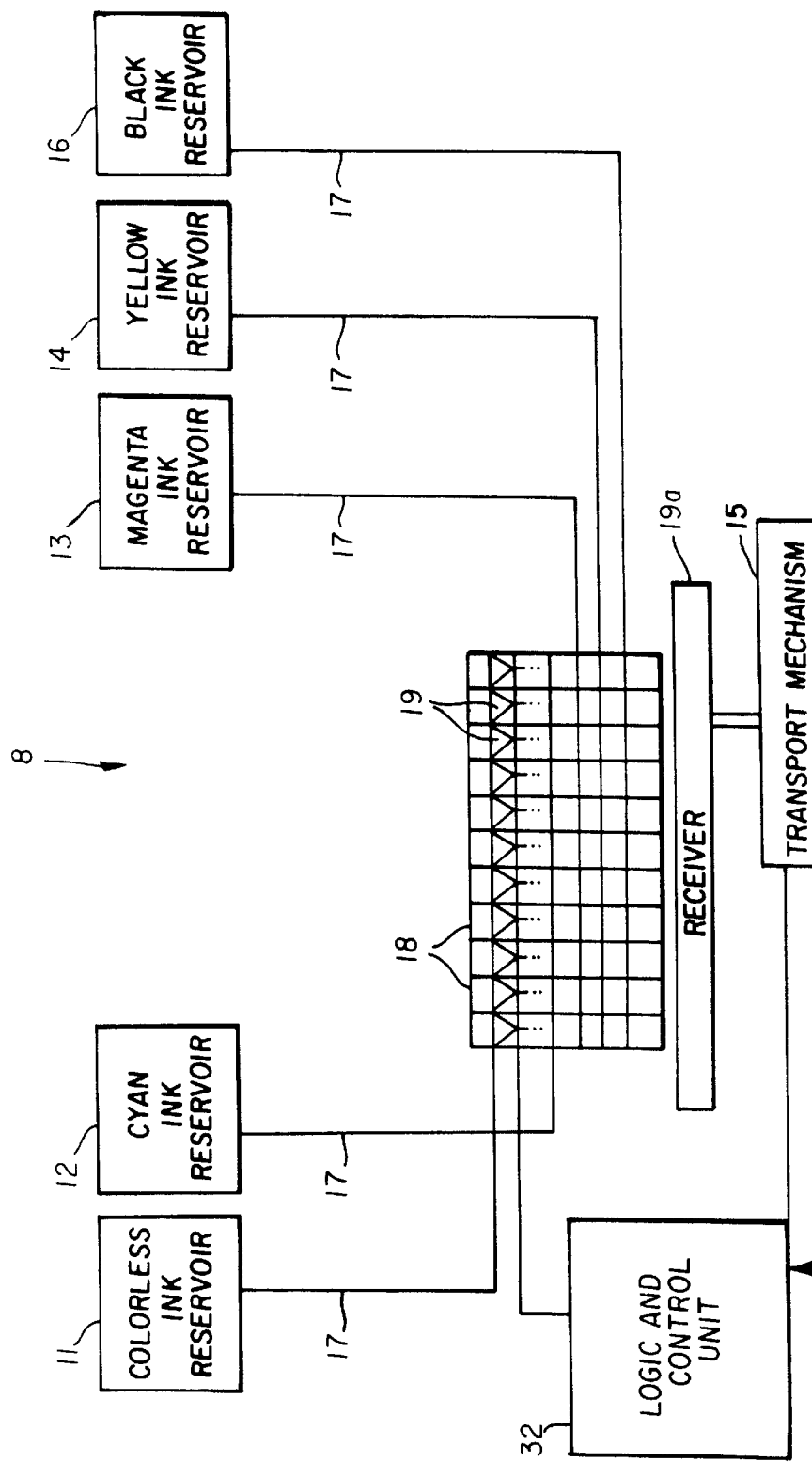
FIG. 3 is a partial schematic view showing a printer for pumping, mixing and printing pixels of ink onto a reflective receiver.

Referring to FIG. 3, a schematic diagram is shown of a printer 8 in accordance with the present invention. Reservoirs 11, 12, 13, and 14 are respectively provided for holding colorless ink, cyan ink, magenta ink, and yellow ink. These reservoirs are actually provided by ink cartridges which are insertable into the printer 8 of the camera. A reservoir 16 is shown for black ink. Microchannel capillaries 17 respectively connected to each of the reservoirs conduct ink from the corresponding reservoir to an array of ink delivery chambers 18. In the present invention, the ink delivery chambers 18 deliver the ink directly to a receiver 19a; however, other types of ink delivery arrangements can be used such as microfluidic channels, and so when the word chamber is described, it will be understood to include those arrangements. The colored inks are delivered to ink delivery chambers 18 by electrokinetic pumps 19. The amount of each color ink is controlled by logic and control unit 32 according to a stored digital image. For clarity of illustration, only one electrokinetic pump 19 is shown for the colorless ink channel. Similar pumps are used for the other color channels, but these are omitted from the figure for clarity. Finally, a receiver 19a is transported by a transport mechanism to come in contact with the microfluidic printer 8. The receiver 19a accepts the ink and thereby produce the print.

Figure 4:
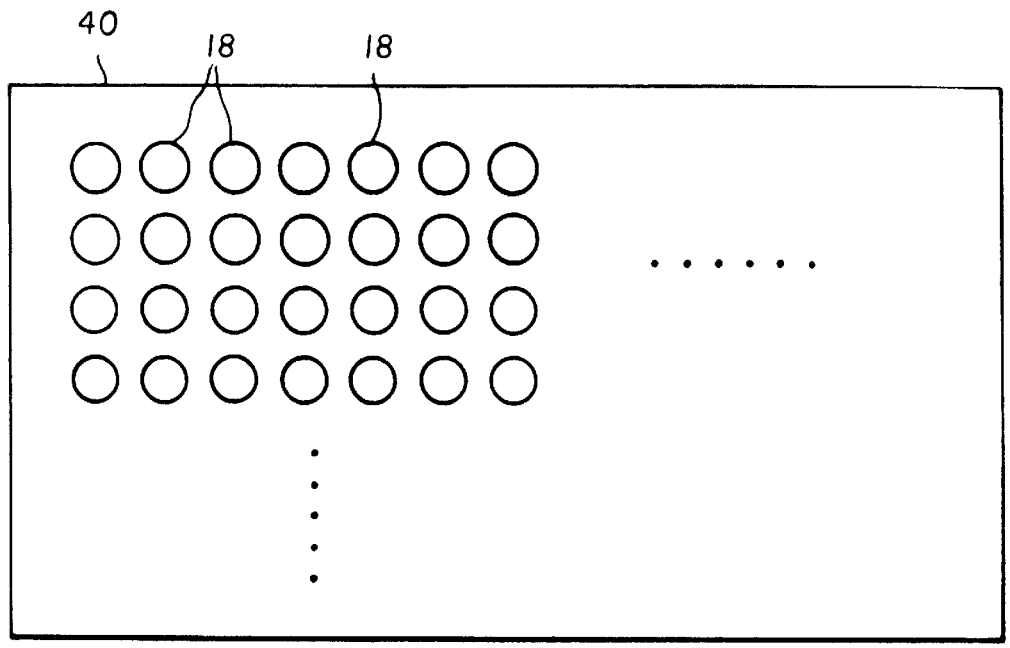
FIG. 4 is a top view of the colorant delivery chambers in the printer of FIG. 3.

FIG. 4 depicts a top view of an arrangement of delivery chambers 18 shown in FIG. 3. Each ink delivery chamber 18 is capable of producing a mixture of inks of different colors having any color saturation, hue, and lightness within the color gamut provided by the set of inks used in the apparatus. This results in a continuous tone photographic quality image on the reflective receiver 19a. As shown in FIG. 3, there is provided a logic and control unit 32 which receives a digital image. The digital image includes a number of digital pixels which represents a continuous tone colored image. The logic and control unit 32 is connected to the electrokinetic pump 19 and controls its operation. More particularly, it causes the pump to meter the correct amount of inks into each of the ink delivery chambers 18 to provide both the correct hue and tone scale for each colored pixel. Another function of the logic and control unit 32 is to arrange the array of image pixels in the proper order so the image will be right reading to the viewer. The logic and control unit 32 includes a matrix, or look-up table, which is determined experimentally, of all the colors which can be achieved by varying the mixture of inks. When a data for a particular pixel (8 bits per color plane) is inputted, the output from the look-up table will control signals to the electrokinetic pumps 19 to meter out the correct amount of each ink. Also provided is a transport mechanism 15 which is adapted to move the receiver 19a into and out of engagement with the ink delivery chambers 18 under the control of the logic and control unit 32. After the ink delivery chambers 18 have the appropriate amount of mixed ink, the logic and control unit 32 signals the transport mechanism 15 to move the receiver 19a into engagement with the ink delivery chambers 18 for ink transfer.

The colored inks used in this invention are dispersions of colorants in common solvents. Examples of such inks are found is U.S. Pat. No. 5,611,847 by Gustina, Santilli, and Bugner. Inks are also be found in the following commonly assigned U.S. patent application Ser. No. 08/699,955 filed Aug. 20, 1996 entitled "Cyan and Magenta Pigment Set"; U.S. patent application Ser. No. 08/699,962 filed Aug. 20, 1996 entitled "Magenta Ink Jet Pigment Set"; U.S. patent application Ser. No. 08/699,963 filed Aug. 20, 1996 entitled "Cyan Ink Jet Pigment Set", all by McInerney, Oldfield, Bugner, Bermel, and Santilli; and in U.S. patent application Ser. No. 08/790,131 filed Jan. 29, 1997 entitled "Heat Transferring Inkjet Ink Images" by Bishop, Simons, and Brick; and U.S. patent application Ser. No. 08/764,379 filed Dec. 13, 1996 entitled "Pigmented Inkjet Inks Containing Phosphated Ester Derivatives" by Martin, the disclosures of which are incorporated by reference herein. In a preferred embodiment of the invention the solvent is water. Colorants such as the Ciba Geigy Unisperse Rubine 4BA-PA, Unisperse Yellow RT-PA, and Unisperse Blue GT-PA are also preferred embodiments of the invention. The colorless ink of this invention can take a number of different forms, which will suggest themselves to those skilled in the art. If the colored inks are water soluble, then the colorless ink can indeed be water.

The reflective receiver 19a can be common paper having sufficient fibers to provide a capillary force to draw the ink from the ink delivery chambers 18 into the paper. Synthetic papers can also be used. The receiver 19a can have a coated layer of polymer which has a strong affinity, or mordanting effect for the inks. For example, if a water based ink is used, the colorless ink can be water, which also acts as a solvent, and a layer of gelatin will provide an absorbing layer for these mixed inks. In a preferred embodiment of the invention, an exemplary reflective receiver is disclosed in commonly assigned U.S. Pat. No. 5,605,750 to Romano et al.

Figure 1:
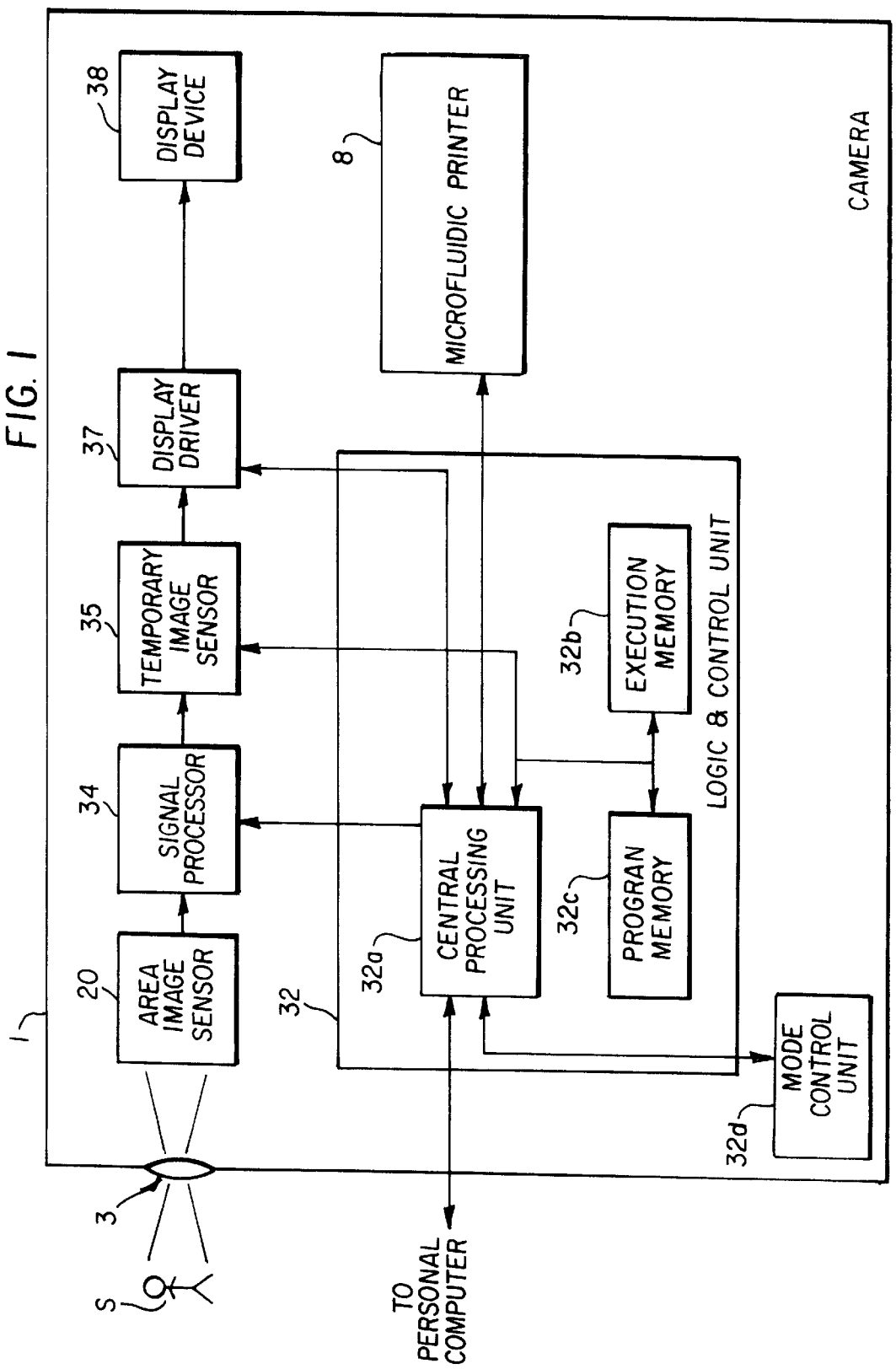
FIG. 1 is a block diagram of a digital camera in accordance with the present invention with the necessary electronics for operating the camera and having a microfluidic printer.

Now turning to FIG. 1, a block diagram is shown of various systems within the camera 1. As shown, a subject S is positioned in front of the imaging lens 3. The camera 1 includes an area image sensor 20 arranged to coincide with the axis of the imaging lens 3. The printer 8 has been discussed. An image of the subject is focused on the area image sensor 20. Area image sensor 20 can be a full frame charge coupled device (CCD) or, alternatively, can be an interline device with, for example, photodiode pixels which are adapted to deliver charge to interline CCDs. Conventional electronic circuitry (not shown) is associated with the image sensor 20. After the image sensor 20 receives light representative of the image of the subject S, the circuitry sets up, acquires, and transfers electronic signals from the area image sensor 20. Such electronics are well known in the art and their description is omitted for clarity of discussion.

Logic and control unit 32 causes the area image sensor 20 to transfer electrical signals to signal processor 34. The signal processor 34 will be understood to include that circuitry necessary for converting the area image sensor signals to electrical signals and includes gain control and analog-to-digital circuitry as well known in the art. The logic and control unit 32 can, of course, include a microprocessor as is well known to those skilled in the art. The signal processor 34 delivers, under the control of logic and control unit 32, signals into a storage location in a temporary image memory 35 which can be either a floppy disk or semiconductor memory under the control of logic and control unit 32. These signals, when stored, represent a digital image of the subject. The logic and control unit 32 causes the digital signals in memory to be applied to a display driver 37 which, in turn, applies signals to a display device 38. The display driver 37 will be understood to include a digital-to-analog converter and formatting control which is appropriate for the type of display device as well known in the art. The display device 38 may be embodied as a liquid crystal display. As well understood to those skilled in the art, the logical and control unit 32 provides refresh signals to the display device 38. It will be understood that the logic and control unit 32 can also deliver the digital image to an external device such as a personal computer.

The logic and control unit 32 is shown to include a central processing unit 32a which may be provided by a microprocessor chip. Execution memory 32b is also shown and is typically provided by random access memory (RAM). This memory is used for computation during image adjustment of the various parameters. As is well known to those in this art, the program memory 32c (typically ROM) can include conventional image processing algorithms for changing image resolution and the color content by so-called color management programs. A mode control unit 32d, including a keyboard, a manual switch or a combination of both, permits a user to select the appropriate program by directly inputting interrupt signals into the central processing unit 32a.

Many of such image processing algorithms have been implemented as commercially available packages such as: Photoshop (trademark of Adobe Systems Incorporated), Color Studio (trademark of Letraset), and PhotoMac (trademark of Avalon Development Group). For examples of color management systems including color transforms for changing color content such as contrast, brightness, and gamut, see U.S. Pat. Nos. 5,313,611 and 5,432,906, the disclosures of which are incorporated herein by reference.

Figure 5:
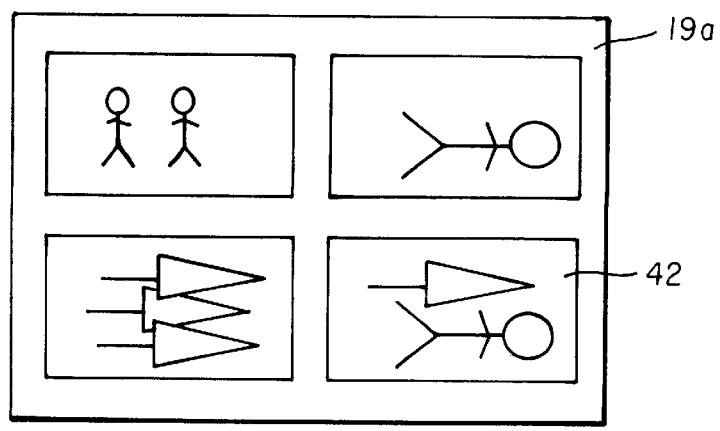
FIG. 5 shows a receiver sheet having multiple different images printed on it.

As described above, the user may indicate the selection of a lower resolution image to be printed by manipulating mode control unit 32d. This selection causes logic and control unit 32 to operate the electrokinetic pumps 19 in a manner which leaves some ink colorant delivery chambers 18 void of any colorant. Those ink colorant delivery chambers 18 which receive ink are simultaneously caused to receive proportionately more ink thus filling more of the image area to be printed with similar image data. The number of pixels are actually reduced and the resolution also reduced without changing the image size. In such a situation, an image on a receiver 19a can be printed faster than when the full number of pixels are printed. Alternatively, the number of ink colorant delivery chambers 18 can be greater than the number of desired pixels in an image. For example, the size of a printed image can be reduced from a full size image by not using some of the ink colorant delivery chambers 18. In the case where the number of printed pixels is less than the full size number of ink colorant delivery chambers 18, multiple images of the same digital image can be printed. Also, multiple different images 42 can be printed on the same receiver 19a (see FIG. 5). In a similar fashion, the user may indicate that a monochromatic rendering of the image is preferred again by using the mode control unit 32d. In this case, logic and control unit 32 causes the operation of electrokinetic pumps 19 to selectively draw ink from a single reservoir in accordance with the selection of the user by operation of mode control unit 32d.

The present invention is described in relation to a continuous tone printer. It will be understood by those skilled in the art that the term "continuous tone images" will include not only continuous tone images recorded from nature, but also computer generated images, graphic images, line art, text images and the like. It will also be understood that the term "colorless ink" refers to colorless or white fluids that do not absorb visible light when the colorless ink is transferred to a reflective receiver.

The typical printing operation in the present invention involves the following steps. First, the logic and control unit 32 receives a digital image or digital image file consisting of electronic signals in which the color code values are characterized by bit depths of an essentially continuous tone image, for example, 8 bits per color per pixel. Based on the color code values at each pixel in the digital image, which define the lightness, hue, and color saturation at the pixel, logic and control unit 32 operates the electrokinetic pumps 19 to mix the appropriate amount of colored inks and colorless inks in the array of ink colorant delivery chambers 18. Stated differently, the corresponding mixed inks in each chamber 18 are in an amount corresponding to a code value for a digital colored pixel. The mixture of inks, which has the same hue, lightness, and color saturation as the corresponding pixel of the original image being printed, is held in the colorant delivery chamber by the surface tension of the ink. The reflective receiver 19a is subsequently placed by the transport mechanism 15 under the control of the logic and control unit 32 in contact with the ink meniscus of the ink colorant delivery chamber 18 within the printer front plate 40. The mixture of inks contained in the colorant delivery chamber 18 is then drawn into the reflective receiver 19a by the capillary force of the paper fibers, or by the absorbing or mordanting force of the polymeric layer coated on the reflective receiver 19a. The receiver 19a is peeled away from the ink colorant delivery chamber 18 in the printer front plate immediately after the time required to reach the full density of the print. The receiver 19a cannot be left in contact with the front plate for too long a time or the density of the print will be higher than desired. One important advantage of the present invention is the reduction of the printing image defects that commonly occur when the cyan, magenta, and yellow inks are printed in separate operations. Misregistration of the apparatus often leads to visible misregistration of the color planes being printed. In this invention, all the color planes are printed simultaneously, thus eliminating such misregistration.

Ink from the black ink reservoir 16 can be included in the colored in mixtures to improve the density of dark areas of the print, or can be used alone to print text, or line art, if such is included in the image being printed.

Figure 2:
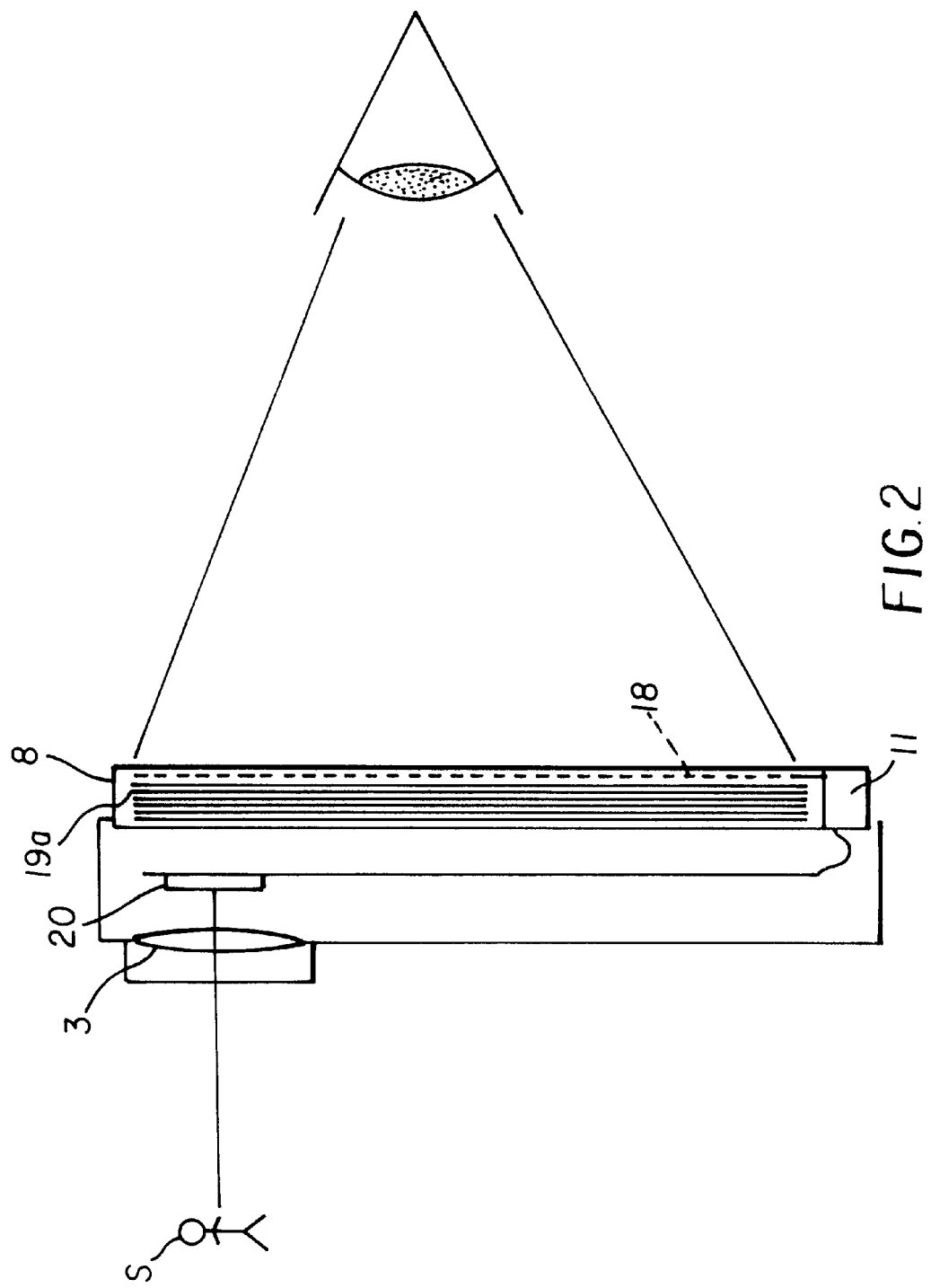
FIG. 2 is a side showing a user viewing the delivery chambers of the printer prior to printing an image.

In an alternate scheme for this invention shown in FIG. 2, which is a side view showing a user viewing the rear side of delivery chambers 18, the microfluidic printer 8 also performs the function of a display prior to printing. The construction of the printer 8 is such that a user can view the reverse side of the delivery chambers 18. The delivery chambers 18 are fabricated in a glass member so that they can be readily observed by a user. In this way, the printer also displays an image to be printed. This is disclosed in the above referenced U.S. patent application Ser. No. 08/882, 620 filed Jun. 25, 1997. As shown, a receiver 19a is arranged to contact the chambers and to draw ink from such chambers by capillary action.

The invention has been described in detail with particular reference to certain preferred embodiments thereof, but it will be understood that variations and modifications can be effected within the spirit and scope of the invention.

Parts List

S subject
1 camera
3 imaging lens
8 printer
11 reservoir
12 reservoir
13 reservoir
14 reservoir
15 transport mechanism
16 black ink reservoir
17 microchannel capillaries
18 ink delivery chambers
19 electrokinetic pumps
19a receiver
20 area image sensor
32 logic and control unit
32a central processing unit
32b execution memory
32c program memory
32d mode control unit
34 electrical signal processor
35 temporary image memory
37 display driver
38 display device
40 printer front plate
42 multiple images

What is claimed is:

1. In an electronic camera responsive to a digital image stored in such camera, and having a multimode microfluidic printer for printing images of different resolutions onto receivers corresponding to the stored digital image, the improvement comprising:
   a) means for focusing an image of a subject at an image plane;
   b) area image sensor means disposed at the image plane for receiving the image subject and producing a digital image representing the subject;
   c) storage means coupled to the area image sensor for storing the digitized image of the subject; and
   d) the microfluidic printer including a plurality of colorant reservoirs including several reservoirs for containing different colorants and a plurality of colorant delivery chambers;
   e) selectable mode control means responsive to a selected mode of operation including different pixel spacing and colored images and the stored digital image for causing colorants to be delivered from colorant reservoirs to selected colorant delivery chambers in the correct amount; and
   f) means for causing the transfer of the colorants in the chambers to the receiver.

2. The camera of claim 1 further including means defining colorant delivery chamber and means responsive to information in the digital image for mixing the correct amount of colorless ink with cyan, magenta, or yellow inks in the colorant delivery chamber to produce both the correct hue tone scale for each colored pixel.

3. The camera of claim 2 wherein said digital information responsive means includes pump means for causing the desired mixture of inks in each colorant delivery chamber of each colored pixel in accordance with the digital image.

4. The camera of claim 2 wherein one of the reservoirs contains black ink.

5. The camera of claim 2 wherein different colorants from the reservoirs are mixed in the colorant delivery chambers to provide a desired color.

6. The camera of claim 2 wherein the selectable mode control means further includes means for varying spacing between pixels by leaving some of the colorant delivery chambers empty.

7. The camera of claim 1 wherein the delivery chambers are arranged so that a user can view an image prior to its printing.

8. The camera of claim 1 wherein multiple images are transferred onto the receiver.

9. In an electronic camera responsive to a digital image stored in such camera, and having a multimode microfluidic printer for printing images of different resolutions onto receivers corresponding to the stored digital image, the improvement comprising:

a) means for focusing an image of a subject at an image plane;

b) area image sensor means disposed at the image plane for receiving the image subject and producing a digital image representing the subject;

c) storage means coupled to the area image sensor for storing the digitized image of the subject; and d) the microfluidic printer including a plurality of ink colorant reservoirs including several reservoirs for containing different ink colorants and a plurality of ink colorant delivery chambers;

e) selectable mode control means responsive to a selected mode of operation including different pixel spacing, monochrome and colored images and the stored digital image for causing ink colorants to be delivered from ink colorant reservoirs to selected ink colorant delivery chambers in the correct amount; and f) means for causing the transfer of the ink colorants in the chambers to the receiver.

* * * * *